UNITED STATES PATENT OFFICE.

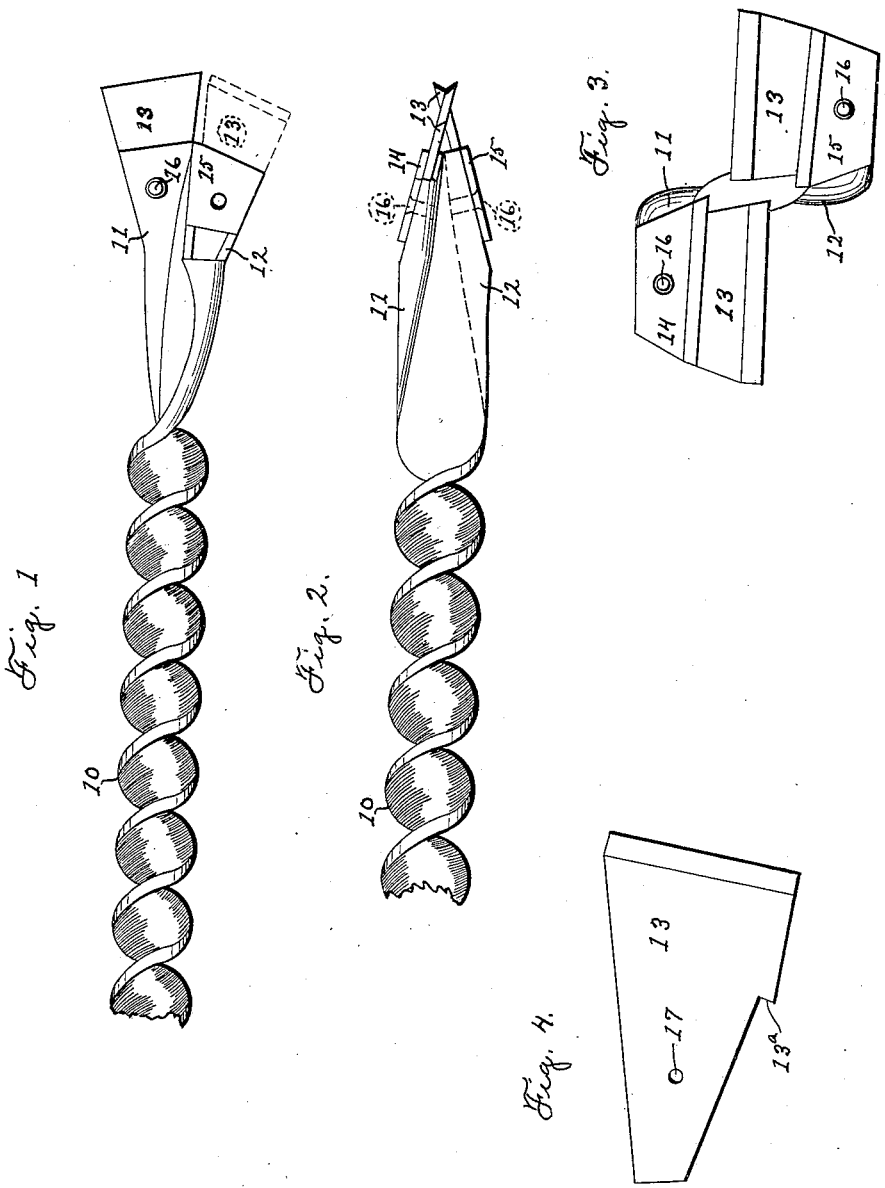

JOHN UNDERATION, OF HOCKING, IOWA.

MINER'S AUGER.

1,104,231.  Specification of Letters Patent.  Patented July 21, 1914.

Application filed May 21, 1913. Serial No. 769,097.

*To all whom it may concern:*

Be it known that I, JOHN UNDERATION, a citizen of the United States of America, and resident of Hocking, Monroe county, Iowa, have invented a new and useful Miner's Auger, of which the following is a specification.

The object of this invention is to provide an improved construction for augers especially adapted for use in the mining of coal.

A further object of this invention is to provide an improved auger head having removable and replaceable blades.

A further object of this invention is to provide improved means for mounting a cutting blade in an auger head.

A further object of this invention is to provide a construction for a miner's auger which will avoid the necessity of using several augers of different sizes and lengths in the production of a given hole.

My invention consists in the construction, arrangement and combination of elements hereinafter set forth, pointed out in my claim and illustrated by the accompanying drawings, in which—

Figure 1 is a side elevation illustrating an auger embodying my invention. Fig. 2 is an elevation at right angles to Fig. 1. Fig. 3 is an end view of the device on an enlarged scale. Fig. 4 is a view of a blade detached.

In the construction of the device as shown the numeral 10 designates the body portion of an auger of common and well known form, which auger may be provided with any desired turning means or suitable means (not shown) for mounting in a coal-mining machine. The auger 10 is formed at its head with integral socket members 11, 12 on opposite sides of the axis of the auger. The socket members 11, 12 are formed with relatively flat, angular trapeziform sockets opening to their outer or rearward faces, and said sockets preferably are inclined forwardly in the direction of the spiral advance of the auger. Cutting blades 13, 13 are provided and said blades are alike and adapted to be removably and replaceably and interchangeably mounted in the sockets of the members 11, 12, to which they are fitted. The blades 13, 13 are secured in place in their sockets by means of plates 14, 15, which latter are held in place by screws 16 passing therethrough and seated in the rear faces of the socket members 11, 12. Each blade 13 is formed with a screw hole 17 for passage of the screw 16 or bolt. The blades 13 are beveled on their rearward faces and are inclined at their cutting edges outwardly and back from the axis of the auger. The inclination of the sockets and the blades 13 therein is such that the cutting edges of said blades project slightly across the axis of the auger and the initial lines of the two bevels are in approximately the same transverse line, as shown in Figs. 2 and 3. The blades 13 flare outwardly toward their cutting edges so that their combined width at their tips is materially greater than the body of the auger, preferably about twice as great. Each blade 13 preferably is formed with a shoulder 13$^a$ on its outer margin adapted to engage the outer end of a socket member 11 or 12.

In use the blades 13, 13, revolving about the axis of the auger, cut away and loosen the material, such as coal, and make a pathway for the auger body. The use of this device obviates the employment of a number of augers of diminishing bore and increasing length in the production of a given hole, for the reason that the blades 13, 13 prepare the way for the auger proper. As soon as a blade 13 begins to lose its edge it is removed and replaced by another selected from a supply carried for that purpose, and thus the efficiency of the tool is maintained at all times. The removed blades are readily sharpened and again made ready for use.

I claim as my invention—

A device of the class described, comprising an auger, socket members formed at the head thereof, outwardly opening sockets in said socket members, blades mounted in said sockets, plates overlying said blades, and screws passing through said plates and blades and seated in said socket members.

Signed by me at Hocking, Iowa, this 12th day of April, 1913.

JOHN UNDERATION.

Witnesses:
 MIKE UNDERATION,
 THOS. McLEOD, Jr.

Copies of this patent may be obtained for five cents each, by addressing the "Commissioner of Patents, Washington, D. C."